Dec. 29, 1931.  T. DE LA MARE  1,838,686
DEVICE FOR REPAIRING STRUCTURES CONFINING FLUID UNDER PRESSURE
Filed April 4, 1927  2 Sheets-Sheet 1
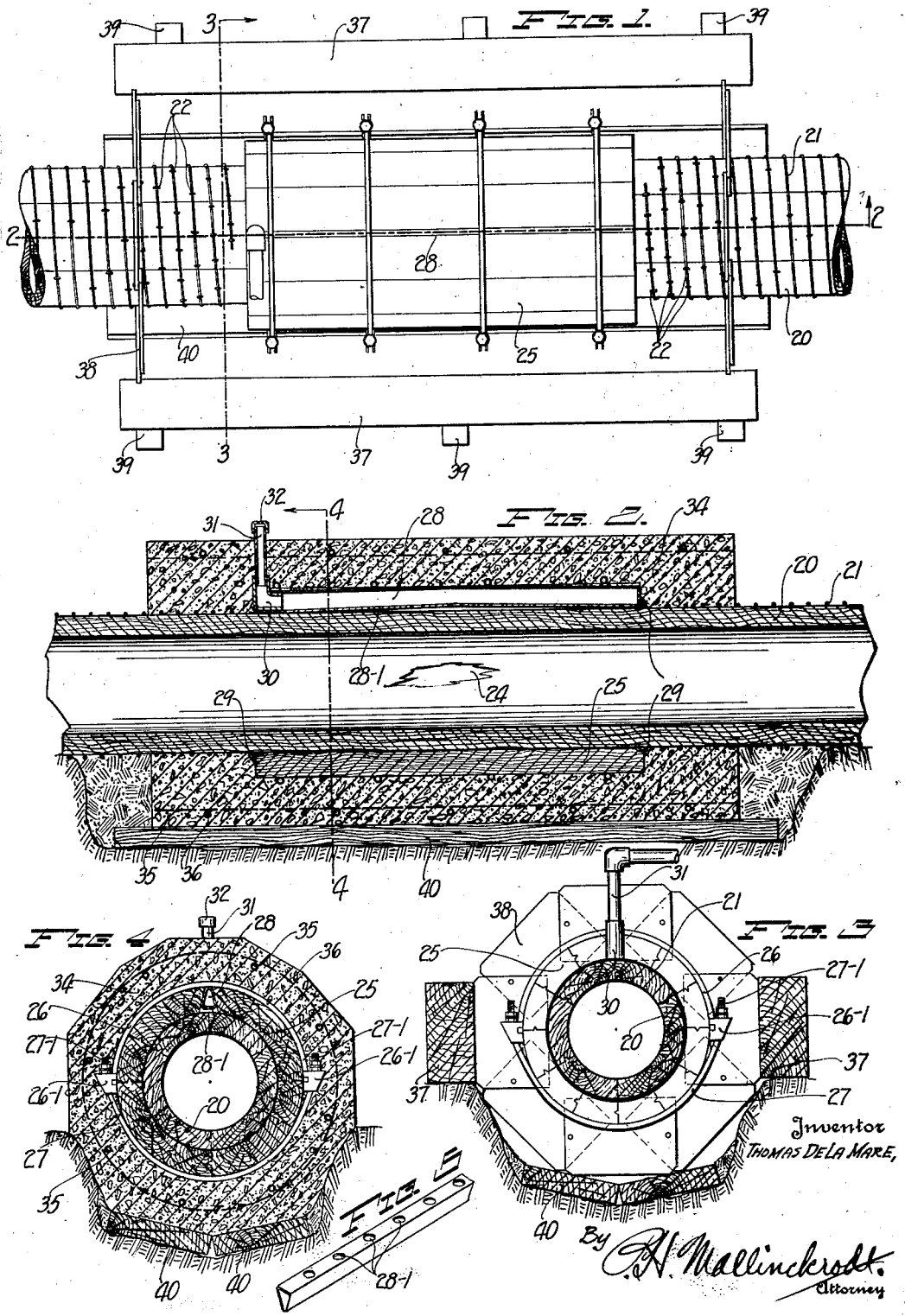

Dec. 29, 1931. T. DE LA MARE 1,838,686
DEVICE FOR REPAIRING STRUCTURES CONFINING FLUID UNDER PRESSURE
Filed April 4, 1927 2 Sheets-Sheet 2
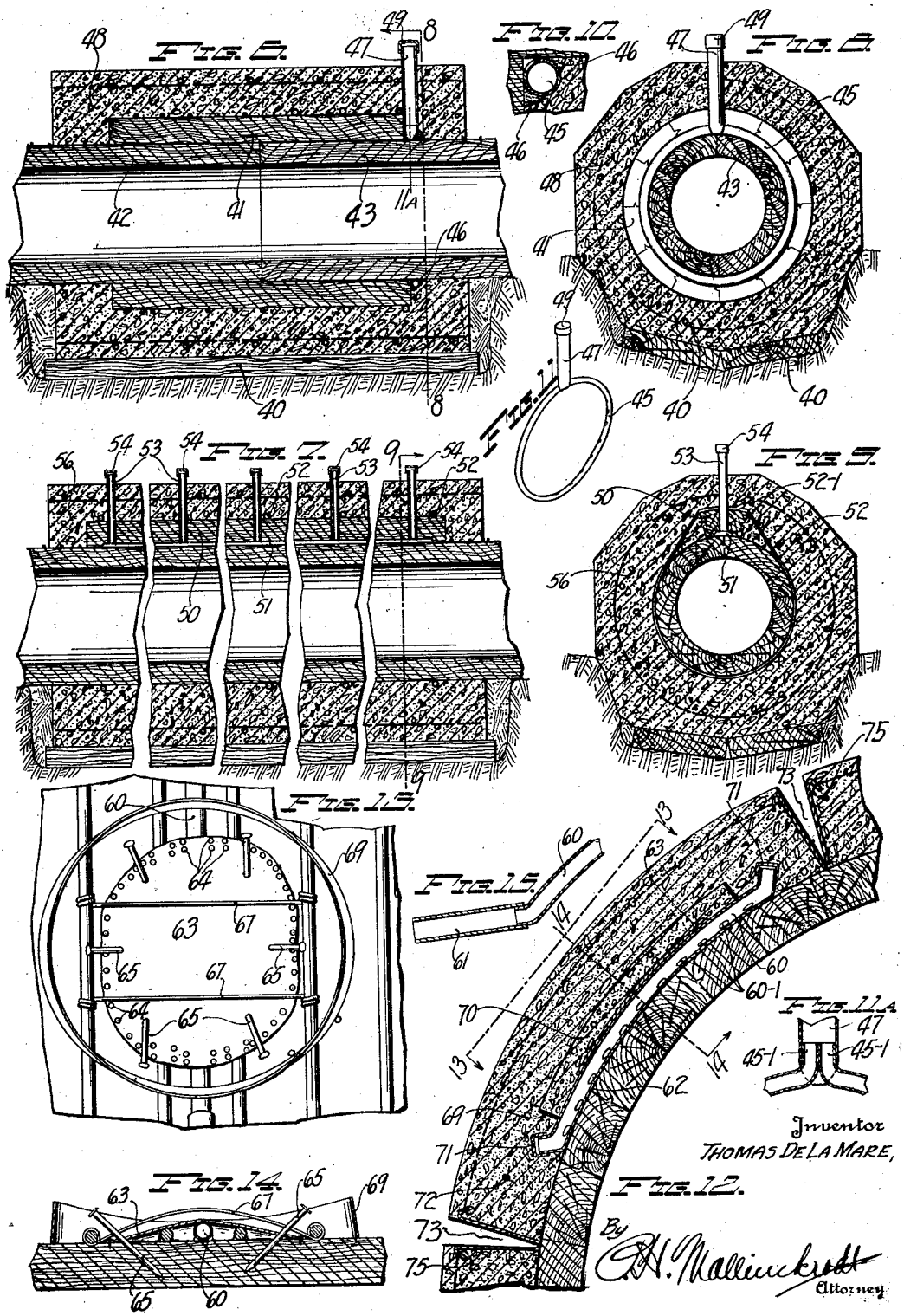
Inventor
THOMAS DE LA MARE, Patented Dec. 29, 1931

1,838,686

UNITED STATES PATENT OFFICE

THOMAS DE LA MARE, OF SALT LAKE CITY, UTAH

DEVICE FOR REPAIRING STRUCTURES CONFINING FLUID UNDER PRESSURE

Application filed April 4, 1927. Serial No. 180,974.

This invention relates to a device for repairing structures confining fluid under pressure, such as pipes or tanks, and its principal objects are:

First. To provide simple and efficient means for permanently stopping leaks of fluid in pipes or tanks under pressure.

Second. To strengthen such structures and render them more durable.

Third. To be quickly and economically installed.

Fourth. To make its construction possible by workmen of average skill and of materials readily obtainable.

This invention fills a large and varied field of usefulness, and is applicable in many different forms.

Ordinarily, pipes through which water or gas is conducted and tanks in which water or gas is confined, whether made of wood or metal, are subject to deterioration which takes place with greater or lesser rapidity depending upon many varying factors.

Iron pipe often corrodes in localized spots due to electrolysis and other causes. Wood pipe is almost invariably subject to decay while in service, and many times defective pieces of timber find their way into the construction of new pipe, the defects not being discovered until after the pipe is finished and tested. Then the removal of the defective piece becomes practically impossible. In general, the causes of defects in both iron and steel are extremely numerous and vary greatly in character.

After a long experience in repairing water mains, hydraulic power pipe lines, and other hydraulic structures, I have found that a most satisfactory material for making such repairs, without interfering with the service, is concrete. For instance, in the case of a leaky pipe line or water main, if the portion where the leak exists is surrounded with a sleeve of concrete, preferably reinforced and waterproofed, it furnishes a most efficient, durable and altogether satisfactory means of repair. Leaking pipes cannot be successfully repaired with concrete while water is flowing through them, unless the water from the leak is diverted so as not to come into contact with the concrete in its plastic state, nor during the period of curing. Therefore, I have evolved the present invention, and by its use I find that I can successfully repair the most difficult and seemingly hopeless cases of defective conductors and containers of fluid, without shutting off the flow of fluid, nor in any way interfering with the service. This is important, when the cost and inconvenience of shutting off the service are considered. Also, large hydraulic pipe lines are liable to damage and even destruction, when the flow of water is shut off by inexperienced persons, such as the class of labor usually employed to make repairs.

In applying the invention, I have developed several typical forms, in all of which however, the basic purpose is the same. namely, to provide a medium for temporarily segregating the flow of the fluid emerging from the leak, providing a drainage member for diverting the segregated fluid, and then applying the jacket of concrete, reinforced, if desired, in any well known manner to obtain strength.

The features of this invention for which the protection of Letters Patent is desired, are collectively grouped in the claims concluding this specification.

In the drawings, which illustrate various typical forms of this invention,

Fig. 1 represents in plan, a portion of a wood pipe line with forms ready to pour concrete for the repair thereof;

Fig. 2, a section on line 2—2, Fig. 1, after the concrete has been poured and the forms removed;

Fig. 3, a transverse section on line 3—3, Fig. 1;

Fig. 4, a transverse section on line 4—4, Fig. 2;

Fig. 5, a fragmentary portion of the drain, in perspective, showing details thereof;

Fig. 6, a vertical longitudinal center section at the joint between two lengths of wood pipe;

Fig. 7, a vertical longitudinal center section, parts broken away, showing the method of treating an extended leak lengthwise of wooden pipe;

Figs. 8 and 9, cross-sections taken on lines 8—8 and 9—9 of Figs. 6 and 7 respectively;

Fig. 10, an enlargement of a detail;

Fig. 11, a drain such as indicated in Figs. 6, 8 and 10, in individual perspective;

Fig. 11A, a fragmentary section, taken on line 11A, Fig. 6, enlarged;

Fig. 12, a fragmentary cross-section showing an upper portion of a comparatively large wood pipe with a repair of modified construction;

Fig. 13, a plan of a part indicated in Fig. 12, viewed from the line 13—13 in Fig. 12, before any concrete is applied;

Fig. 14, a section on line 14—14, Fig. 12, before any concrete is applied; and

Fig. 15, a fragmentary section of a minor detail.

Referring to the drawings, 20 (Figs. 1 to 4) indicates an ordinary wood stave pipe banded with the steel wire 21. A jagged hole 24 may be supposed to have been broken through the pipe. The apparatus for repairing such a break may consist of a sleeve 25, made of short staves of wood placed around the outside of the pipe 20 and clamped thereon by means of the adjustable bands consisting of the part 26 and the part 27. The former may carry the lugs 26—1 and the latter may have the threaded ends 27—1 engaging the lugs 26—1, and arranged for taking up by ordinary nuts. Placed between any two of the staves of the sleeve 25, but preferably in proximity to the point where the leak in the pipe is greatest, is the extended drain 28. In the present instance, this drain has preferably the shape in cross-section of the letter V inverted, Fig. 4, so that it may be securely wedged longitudinally between two consecutive staves. These short staves form a scab over the leaky portion of the pipe.

The ends of the scab staves may be slightly trimmed off to form a space which is packed with oakum as indicated at 29. In order to cause the scab staves to closely contact the pipe, the band 21 is cut on each side of the scab, and removed. The ends of the band on each side of the scab are fastened securely with staples 22. The scab contacts the outside of the pipe all around, decreasing the flow from the leak to a minimum, and being substantially fluid-tight around the ends of the scab staves, any seepage is compelled to find its way through the holes 28—1 into the drain 28. One end of the drain is sealed, while the other end may be provided with the elbow 30, having the outlet pipe 31, which may afterwards be closed by the screwed cap 32. In order to complete the repair, a sleeve of concrete 34, which may be reinforced by the longitudinal rods 35 and the circumferentially extending members 36, is cast around the scab.

To provide a form for the concrete sleeve, ordinary wooden 2 x 4's may be placed on either side of the scab, and be held apart by the collapsible collars 38 which are placed around the pipe to form the ends of the finished sleeve. The pieces 37 are held in place against the collars by means of the stakes 39, and boards 40 are placed in the bottom of the trench to form the bottom of the mold.

Another instance where this invention is of great service, is at the collared joints of wood pipe of the smaller diameters, up to say twenty-four inches. Wood pipe of these diameters are usually provided with a collar formed of short stave pieces as indicated at 41 (Fig. 6). This collar can be fitted to the pipe 42 and be made perfectly tight at the factory, but the pipe 43, which is placed into the open bell-end of the collar as the pipe is assembled in the field, offers another problem. Almost invariably a leak will be found at every joint when the pipe is tested. The problem of making the joints tight, is one which has baffled many engineers.

My method of treating leaks of this character, is to encircle the pipe 43 with a circumferential drain 45 close up against the end face of the bell, and to make the same tight by means of packing such as oakum, as indicated at 46. The circumferential drain 45 may have its ends 45—1 bent so as to lead into the outlet pipe 47, as clearly shown in Figs. 6, 8, 11 and 11A.

Thus, any leakage of fluid which may find its way out between the pipe 43 and the collar 41, is trapped in the drain 45 and diverted, while the concrete sleeve 48 is being cast around the collar, and while it is in a plastic state. After the concrete sleeve has set and thoroughly cured, the cap 49 is screwed upon the pipe 47, thereby completely stopping all leakage from the pipe line.

Where the leak extends longitudinally along the pipe line for a considerable distance, and along a narrow zone, the procedure detailed in Figs. 7 and 9, is particularly advantageous. In this, a stave 50, which may have its bottom channeled as at 51, is placed over the area embracing the leak. Wires 52 are then placed around the pipe and the stave, and twisted together, as indicated at 52—1, thereby drawing the stave tightly down upon the surface of the pipe. The stave 50 is provided with a series of small pipes 53, each surmounted by a tightly fitting screw cap 54. By removing the caps 54 and slipping flexible tubes (not shown) of rubber over the pipes 53, the fluid discharged by the leak is drawn out of the way while the concrete sleeve 56 is being formed in the manner already described.

Another phase of this invention is where a repair must be made upon a pipe of comparatively large diameter, especially if the leak is confined to a somewhat restricted area. In this phase of the invention, a tubular or channeled member 60 having openings such as the perforations indicated at 60—1, is bent to conform substantially to the contour of the pipe, as indicated at 62. This tubular, perforated conductor is placed in a substantially central position with reference to the leaky area.

Over the drain 60, and positioned so as to embrace the area of the leak, is placed a diaphragm 63, made of flexible material such as sheet rubber. This diaphragm is fastened around its entire perimeter, substantially fluid-tight, by any suitable means such as nails or tacks 64, to the outer surface of the pipe, and forms what I choose to call a blister. Large nails or spikes 65 may be driven through the diaphragm 63 for a purpose which will presently appear. It will be noted that in this phase of the invention, the diaphragm is less extensive in every direction than the surface to which it is applied.

A collar 69, which may be made of an iron band, is placed to encircle the diaphragm 63, leaving a substantial margin between the inside of the band and the edge of the diaphragm. The band 69 provides a form into which may be poured the concrete or other plastic substance to form the cover or scab 70 (Fig. 12). While the cover 70 is in the plastic state, and until after it is thoroughly cured, the seepage fluid of the leak is drawn off through the holes 60—1 in the drain 60, and diverted through the temporary extension 61. Afterwards, the drain 60 is closed at both ends by means of caps 71. It will be clear that the sole purpose of the drain, which may extend through the diaphragm and through the scab, is to discharge fluid outside the scab.

In this manner, the scab 70, which is reinforced and anchored by the projecting spikes 65 and the wires 67, is caused to form a tight seal against the fluid tending to pass through the leak. If desired, a concrete sleeve 72 may be formed entirely around the circumference of the pipe, thereby effecting a neat, workmanlike and substantial repair and reinforcement.

It is well known that the shrinkage of a concrete sleeve of considerable size will cause it to crack. Therefore, I provide at intervals along the circumference, expansion or contraction joints 73, which may be constructed of V-shaped metal channels 75 in accordance with my application for U. S. patent filed April 17, 1925, Serial No. 23,841.

Having fully described my invention, what I claim is:

1. The combination with a pipe confining fluid under pressure, of a blister attached to said pipe, a drain for said blister, said drain comprising a tubular member having openings contiguous to the surface of the said pipe, and a covering of plastic material for the said blister.

2. A container having therein a fluid under pressure, and a leak defined in the structure of the said container, a flexible blister arranged to conform to the outside contour of said container, a perforated tubular drain extending under said blister and protruding therefrom, a scab of concrete formed over said blister, and means for plugging said drain when said concrete has cured.

3. In a device for repairing structures confining fluid under pressure, a sleeve of concrete formed around said structure, a perforated tube extending along the outside surface of said structure but within said sleeve, said tube being effective to conduct fluid from said surface while the sleeve is being formed, and means for plugging the said tube when the said concrete has cured.

4. In a device for repairing structures confining fluid under pressure, a blister, a perforated tube extending under said blister and protruding therefrom, a scab of concrete formed over said blister, said tube being effective to conduct fluid from said blister while said concrete is in the plastic stage, means for plugging said drain when the concrete has passed the plastic stage, and a concrete sleeve extending around the said structure in a manner to completely enclose said scab.

5. A device for repairing structures confining fluid under pressure, comprising a blister of flexible material conforming and attached to, said pipe, a perforated tubular drain extending into and protruding from said blister, and a covering of concrete for said blister, said concrete being anchored to said structure.

6. A device for repairing a structure confining fluid under pressure, comprising the combination with said structure, of a diaphragm, means for attaching said diaphragm to said structure so as to define a substantially fluid-tight space, a collar around said diaphragm, a conductor for fluid extending from said space to a point outside said collar, and a scab within said collar.

7. A device for repairing a structure confining fluid under pressure, comprising the combination with said structure, of a diaphragm, means for attaching said diaphragm to said structure so as to define a substantially fluid-tight space, reinforcing means attached to said structure contiguous to said diaphragm, a form around said diaphragm and reinforcing means, a conductor for fluid leading from said substantially fluid-tight space to a point outside said form, and a plastic filling within said form.

8. A device for repairing a structure confining fluid under pressure, comprising the combination with said structure, of a diaphragm adjacent a surface of the structure, said diaphragm being less extensive along the circumference of said structure than said circumference and having its entire perimeter fastened substantially liquid-tight to said structure, a scab of plastic material extending over said diaphragm, and a drain extending through said diaphragm and through said scab.

9. A device for repairing a structure confining fluid under pressure, comprising the combination with said structure, of a diaphragm positioned upon a surface of said structure, said diaphragm being less extensive in every direction than said surface and being fastened substantially fluid-tight at substantially its entire perimeter to said structure, a drain protruding through said diaphragm, and a scab of plastic material attached to said structure over said diaphragm, said drain being effective to discharge fluid outside of said scab.

In testimony whereof I sign my name hereto.

THOMAS DE LA MARE.